United States Patent [19]

Barowski et al.

[11] 3,936,169

[45] Feb. 3, 1976

[54] DEVICE FOR MOVING SLIDES VERTICALLY IN PROJECTORS

[75] Inventors: Karlheinz Barowski, Okriftel; Kurt Schübel; Hans Welnhofer, both of Munich, all of Germany

[73] Assignees: Braun Aktiengesellschaft, Frankfurt am Main; Enna-Werk Optische Anstalt, Munich, both of Germany

[22] Filed: Sept. 6, 1974

[21] Appl. No.: 503,567

[30]  Foreign Application Priority Data

Sept. 7, 1973  Germany............................ 2345333

[52] U.S. Cl. .................. 353/115; 353/95; 353/107; 353/117
[51] Int. Cl.² ......................................... G03B 23/04
[58] Field of Search......... 353/115, 95, 97, 103–118

[56]  References Cited
UNITED STATES PATENTS

| | | | |
|---|---|---|---|
| 2,016,978 | 10/1935 | Thomas .............................. | 177/351 |
| 3,411,845 | 11/1968 | Prester et al......................... | 353/115 |
| 3,632,200 | 1/1972 | Frey..................................... | 353/109 |
| 3,856,391 | 12/1974 | Hickey et al...................... | 353/111 X |

*Primary Examiner*—Richard E. Aegerter
*Assistant Examiner*—Larry Jones
*Attorney, Agent, or Firm*—Sughrue, Rothwell, Mion, Zinn & Macpeak

[57]  ABSTRACT

The device is provided with a lever which is pivotally mounted at one end and is urged in the downward direction by a spring, a slide-carrying shoe being attached at the free end of the lever. The lever has an upwardly curving centre portion which rests on a roller mounted on a disc driven at half-speed by a motor. The device also comprises a slide guide consisting of two prismatic rails, one of which is stationary, while the other is secured to a carriage mounted displaceably in the plane of the slide and capable of being pulled towards the stationary rail by means of a spring. There is a coupling pin on the carriage which is engaged with a control cam provided on the lever-driving disc, the said cam being designed in a manner such that the movable prismatic rail is pulled back only during the downward movement of the slide shoe which moves between the prismatic rails, the said slide being otherwise pressed against the stationary rail under the action of the spring. In its lowermost position, the slide shoe may rest upon a stop which is vertically adjustable in order to be able to set the slide accurately in relation to the optical axis. The stop for the slide shoe is preferably mounted at the end of a double-ended, spring-loaded lever, the setting of which is adjusted by means of a screw.

5 Claims, 1 Drawing Figure

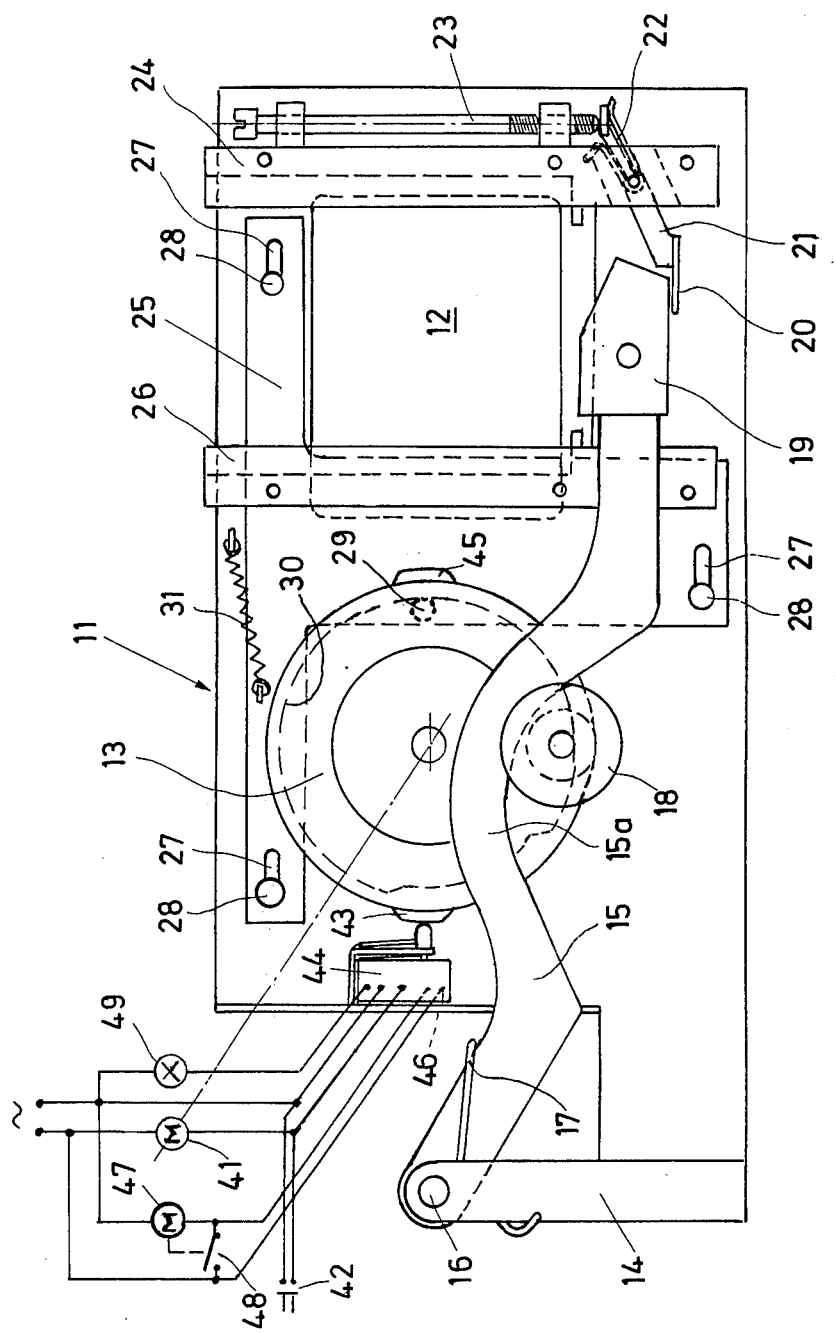

DEVICE FOR MOVING SLIDES VERTICALLY IN PROJECTORS

The invention relates to a device for vertically moving slides in slide projectors. More particularly, the present invention is directed to a device in which the slides are lowered from their upper position in the magazine, through an aperture in the bottom thereof, into a slide seat, after which they are placed in position for projection, and are returned from the slide trench up again into the magazine. Devices of this kind are used especially in conjunction with projectors having circular magazines.

Devices of the type in which the slides are moved vertically with the aid of lever arms and complex crank drives and the like are known. These devices are usually complicated, costly, and thus relatively unreliable.

It is an object of the invention to provide a device which is as simple as possible, and in which the slides may be moved from the magazine to the projector and back again into the magazine.

It is another object of the present invention to provide a device which is sturdy and thus suitable for continuous operation, wherein the parts and the assembly thereof are inexpensive. It is another object of the present invention to provide a device which is as reliable as possible in continuous operation.

According to the invention, this purpose is achieved by providing a device for vertically moving slides in a slide projector which comprises:

a. a lever and means for pivotally mounting said lever at one end thereof,
b. resilient means biasing said lever in downward direction,
c. the other end of said lever being formed with means for holding a slide,
d. guide members adapted to engage a slide when the latter is lowered from a magazine and to release said slide after said slide has been projected,
e. means associated with said lever and said movable guide members to cause simultaneous disengagement of said movable guide members and lifting of said lever in upward position thereby reinserting said slide in said magazine, after which said lever is resiliently urged in lowermost position carrying a next slide therewith while at the same time said movable guide members are drawn towards one another until they engage said next slide when said lever has reached said lowermost position.

Preferably, the device in question is designed in a manner such that there is provided a lever which is pivotally mounted at one end and is urged in the downward direction by a spring, a slide-carrying shoe being attached at the free end of the lever. The lever has an upwardly curving centre portion which rests on a roller mounted on a disc driven at half-speed by a motor. The device also comprises a slide guide consisting of two prismatic rails, one of which is stationary, while the other is secured to a carriage mounted displaceably in the plane of the slide and capable of being pulled towards the stationary rail by means of a spring. There is a coupling pin on the carriage which is engaged with a control cam provided on the lever-driving disc, the said cam being designed in a manner such that the movable prismatic rail is pulled back only during the downward movement of the slide shoe which moves between the prismatic rails, the said slide being otherwise pressed against the stationary rail under the action of the spring.

In its lowermost position, the slide shoe may rest upon a stop which is vertically adjustable in order to be able to set the slide accurately in relation to the optical axis. The stop for the slide shoe is preferably mounted at the end of a double-ended, spring-loaded lever, the setting of which is adjusted by means of a screw.

The centre portion of the pivotally mounted lever which is used to move the slide may be designed in such a manner that the edge thereof which rests on the roller mounted on the lever-driving disc has the shape of an arc having the radius of the rim of the roller, in order to ensure that the lever remains stationary for a certain length of time in its uppermost position.

The lever-driving disc can be provided with cams which actuate switching contacts for switching on and off the motor which drives the disc and for advancing the slide magazine.

The invention will now be illustrated by means of the following drawings in which:

The single FIGURE is a front elevation view of a device according to the invention.

The device illustrated comprises a lever-driving disc 13 which is rotatably mounted on vertical plate 11, the latter being provided with a window 12 in the vicinity of the passage of the ray of light produced by a projector (not shown). The disc 13 is driven by an electric motor 41 which is arranged at the back of the plate 11. The motor 41 is designed to be switched on until the disc 13 has carried out a complete revolution. The disc 13 has a roller 18 which is mounted thereon in the particular manner illustrated in the drawings and which as shown has a rim. A bracket 14 which is provided with a pin 16 is mounted on the plate 11 in the manner illustrated in the drawings. The device also comprises a lever 15 which has a curved center portion 15a and which is mounted at one end on the bracket 14 to pivot about pin 16. Spring 17 which is attached to the bracket 14 is provided for urging lever 15 in the downward direction, so that the bottom edge of the curved center portion 15a rests at all times against roller 18 of the lever driving disc 13.

The other end of the lever 15 which hereinafter will be called the free end thereof is provided with a shoe 19 which is designed in such a manner that the slides can rest thereon. An adjustable stop 20 which is mounted at the lowermost end of double-ended pivotally mounted lever 21 defines the lowermost position which the lever 15 and the shoe 19 can occupy. It will be seen that there is a spring 22 which acts upon the lever 21 and that there is an adjusting screw 23 which is provided for the purpose of adjusting the height of the stop 20.

Resting on plate 11 on one side of window 12 there is a stationary prismatic rail member 24 and also a horizontally movable carriage member 25, the latter carrying movable prismatic rail member 26. It will be noted that movable prismatic rail member 26 is mounted on the other side of the window 12 with respect to the stationary prismatic rail member 24. Carriage 25, which consists of a T-shaped plate, has elongated holes 27 at each end thereof. Retaining pins 28 which are mounted on plate 11 in alignment with elongated holes 27 are allowed to extend through elongated holes 27 in order to retain the carriage 25 over plate 11 and enable a slight back and forth sliding motion of the carriage 25 relative to the plate 11. The device also comprises a coupling pin 29 which is mounted on the carriage 25 in the particular manner illustrated in the drawings and which is adapted to rest against control cam member 30 all as shown in the drawings. The cam 30 is formed on the inner face of disc 13, as illustrated in the drawings. As shown, the device also comprises spring 31 having one end attached to plate 11 and the other end engaged by the carriage 25 thereby enabling the carriage member 25 associated with movable prismatic rail member 26 to be pulled towards stationary prismatic rail member 24 for engaging a slide located between rail members 24 and 26. It should be noted that the tension in the spring should be adjusted to provide a clamping action on the slide which would only be sufficient to secure the slide exactly in position between the two rail members 24 and 26, while still allowing it to be pushed in the upward direction when required, the prismatic rails 24 and 26 then providing the necessary guidance.

As mentioned above, the device comprises a disc-driving motor 41 which is connected to a switch 42 and also to a cam operated switch 44. Before further describing the electrical components, it should be pointed out that the disc 13 carries two switch cams 43, 45 which are mounted on the disc 13 in the particular manner illustrated in the drawings. We have said above that the motor 41 is connected to cam operated switch 44, which can be actuated by switch cam 43. Now there is a second motor which is a magazine feed motor 47, the latter being associated with switch 48 and also with cam operated switch 46. Cam operated switch 46 is designed to be operated by switch cam 45. Finally, there is a switch projection lamp 49 which is connected to one of the contacts of switch 44.

The operation of the device is as follows:

If shoe 19 which is mounted at the end of member 15 is in the uppermost position (not shown in the drawings) the movable prismatic rail 26 will be pulled back against the action of spring 31 by means of the coupling pin 29 and control cam 30 so that when shoe 19 starts to move in the downward direction, the slide can fall or slide out of the magazine into the slide recess between prismatic rail members 24, 26.

As soon as shoe 19 reaches its lowermost position in abutment with stop 20, carriage 25 with movable prismatic rail member 26 will be pulled towards prismatic rail 24 in order to hold the slide.

As will be seen from the drawings, disc-driving motor 41 is switched on and off on the one hand by the means of switch 42, and, on the other hand, by means of switch 44 which is indicated above, is actuated by switch cam 43 mounted on a lever-driving disc 13. If the switch 42 is closed, the driving motor 41 is started to cause pivoting of the lever 15 in uppermost position. If a slide is in the projecting slide recess, it will be returned by being moved up into the magazine. When the lever 15 is in its uppermost position, the second switch cam 45 which is mounted on disc 13 will actuate the second switch 46 thus starting the magazine feed motor 47 to move the slide magazine, thus displacing the magazine by one compartment. Motor 47 is thereafter automatically switched off again by means of switch 48. While the magazine is moving, driving motor 41 which is associated with the lever-driving disc 13 can continue to run, since because of the special configuration of the driving mechanism, shoe 19 remains in its top-dead-center position until the magazine has moved onwards by one compartment. It is also possible, however, to provide an additional switch in order to stop driving motor 41 while the magazine advances. To this end, switch 48 of magazine feed motor 47 could be in the form of a changeover switch in order to switch the driving motor 41 on again.

If cam-operated switch 44 is also designed as a changeover switch, it would also be able to switch projection lamp 49 on and off, thereby switching the lamp 49 on when the slide is in position for projection.

As may be gathered from the drawing and description, the design of the device according to the invention is quite simple and expedient, so that breakdowns during operation are nearly impossible.

The embodiments of the invention in which an exclusive property is claimed are defined as follows:

1. A device for moving slides vertically in slide projectors so that slides may be lowered from a circular magazine into a projection postion and then raised from the projection position back into the magazine, the device being of the type including an arm pivotally mounted at one end, a spring connected to the arm, a shoe on the end of the arm for carrying a slide, a multi-cam disc, an electric motor connected to drive the cam disc, a slide guide arrangement having a pair of spaced prismatic rails to guide and hold the slide in the projection position, a stationary mount for one of the rails and a movable mount for the rail in the plane of a slide in-projection position, a spring urging the movable mount against the multi-cam disc, and a stop positioned to limit the downward movement of the end of the arm carrying the shoe with improvement comprising: means connecting the spring connected to the arm to urge the end of the arm carrying the shoe downwardly, an upwardly curved center portion of the arm, a roller carried by the multi-cam disc and describing a circular path positioned under the upwardly curved center portion of the arm, the configuration and relative position of the roller and upwardly curved center portion of the arm allowing the shoe at the end of the arm to dwell in its uppermost position to allow indexing of the magazine.

2. A device as in claim 1 wherein the stop is always positioned in stopping position below the shoe carrying end of the arm and further comprising a threaded vertically adjustable mounting arrangement connected to the stop to threadably and vertically adjust the stop.

3. A device as in claim 2 wherein the stop is a lever pivotably mounted intermediate its ends, one end of the lever functioning as a stop and the other end contacting the vertically adjustable mounting arrangement, a spring urging the end of the stop against the vertically adjustable mounting arrangement, and wherein the vertically adjustable mounting arrangement includes an adjustment screw having its end in contact with the lever.

4. A device as in claim 3 wherein cams of the multi-cam disc actuate switches controlling the electric motor driving the cam disc and a magazine feed motor.

5. A device as in claim 4 wherein one of the switches also controls a projector lamp.

* * * * *

UNITED STATES PATENT AND TRADEMARK OFFICE
CERTIFICATE OF CORRECTION

PATENT NO. : 3,936,169
DATED : February 3, 1976
INVENTOR(S) : Karlheinz Barowski, Jurt Schubel, and Hans Welnhofer It is certified that error appears in the above-identified patent and that said Letters Patent are hereby corrected as shown below:

IN THE HEADING:

The assignee's names should read: -Braun Aktiengesellschaft and

Enna-Werk Optische Anstalt Dr. Appelt KG - Instead of

" Braun Akiengesellschaft and Enna-Werk Optische Anstalt."

Signed and Sealed this eighth Day of June 1976

[SEAL]

Attest:

RUTH C. MASON
Attesting Officer

C. MARSHALL DANN
Commissioner of Patents and Trademarks